(12) United States Patent
Parthasarathy

(10) Patent No.: US 12,526,212 B2
(45) Date of Patent: Jan. 13, 2026

(54) DETECTING NETWORK CONDITIONS FOR ENTERPRISE USERS

(71) Applicant: Omnissa, LLC, Mountain View, CA (US)

(72) Inventor: Kannan Parthasarathy, Palo Alto, CA (US)

(73) Assignee: Omnissa, LLC, Mountain View, CA (US)

( * ) Notice: Subject to any disclaimer, the term of this patent is extended or adjusted under 35 U.S.C. 154(b) by 333 days.

(21) Appl. No.: 18/096,340

(22) Filed: Jan. 12, 2023

(65) Prior Publication Data

US 2024/0243982 A1 Jul. 18, 2024

(51) Int. Cl.
*H04L 43/04* (2022.01)
*H04L 43/02* (2022.01)

(52) U.S. Cl.
CPC .............. *H04L 43/04* (2013.01); *H04L 43/02* (2013.01)

(58) Field of Classification Search
CPC ....................................................... H04L 43/04
USPC ........................................................ 370/241
See application file for complete search history.

(56) References Cited

U.S. PATENT DOCUMENTS

2017/0060605 A1\* 3/2017 Huang ................... G06F 16/172
2018/0322437 A1\* 11/2018 Mcclory ................... G06F 8/30

\* cited by examiner

*Primary Examiner* — Sibte H Bukhari
(74) *Attorney, Agent, or Firm* — Kim & Stewart LLP

(57) ABSTRACT

Disclosed are various examples for automatically analyzing telemetry data from managed devices in one or more organizations and categorizing devices and/or user accounts as home users, hybrid users, or office users. The categorization can be performed based upon an analysis of a wireless network connection of a client device that is managed by a management service.

14 Claims, 4 Drawing Sheets

DETECTING NETWORK CONDITIONS FOR ENTERPRISE USERS

BACKGROUND

In an enterprise, an enterprise ecosystem can provide a structure for business processes, information flows, and data security for enterprise employees and the overall enterprise organization. Enterprise information technology (IT) administrators strive to keep downtime of critical services as well as end user devices to a minimum. Downtime of critical services and end user devices can negatively impact employee productivity and ultimately affects business performance metrics. Understanding the network conditions under which users are accessing enterprise resources can help administrators manage a population of users. When there is an unusually large volume of help-desk tickets, support personnel analyze what type of network from which the user is connecting to troubleshoot the problem. Additionally, the network type can help tailor the apps and capabilities that are provided to the user. For example, some users might connect from a public network, while others from a home network, and other users might typically work from the office and connect using a private enterprise network. The user experience initially provided to the user can vary depending upon the network type from which the user typically connects to enterprise systems.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to a system that automatically categorizes users and/or devices into categories depending upon the type of network from which the users' respective devices are connecting to enterprise resources. For example, a user might connect to enterprise resources, such as a management service with which the device is enrolled as a managed device, from a public network, such as a public Wi-Fi network, a home network, or an enterprise network that is provided by or managed on behalf of the enterprise. A public network can include, for example, a Wi-Fi network in an airport, coffee shop, hotel, or another location where the network is not managed by the enterprise. A home network can include a network associated with a user's home or a private network that is not managed by the enterprise and that is also not a public network. Information technology (IT) administrators might wish to profile users or devices into categories that identify whether the user or device primarily connects to enterprise resources from a public network, a home network, or an enterprise network because the IT administrator can vary the experience or resources available to the user or device.

For example, users that primarily connect to enterprise resources while at the office and connected to an enterprise network can be provided with an experience or resources that are different from users that connect to enterprise resources primarily from home or a public network. According to various embodiments, telemetry data can be collected from managed devices across multiple organizations and/or enterprises. The collected data can be used to analyze the properties of the network from which the user or device is connecting, such as a service set identifier (SSID) of a wireless network to which a device is connected that can be analyzed to determine the type of network that is being utilized by the client device. The network type can be categorized as a home network, a public network, or an enterprise network. Examples of the disclosure can analyze a network condition or property across multiple organizations, such as in a multi-tenant environment, to enhance the accuracy of the categorization of a network as a public network, home network, or enterprise network.

By utilizing SSID of a Wi-Fi network rather than IP address, the network of a user can be accurately assessed because relying upon IP address can lend to inaccuracies due to the use of virtual private networks, for example.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principles disclosed by the following illustrative examples.

Figure 1:
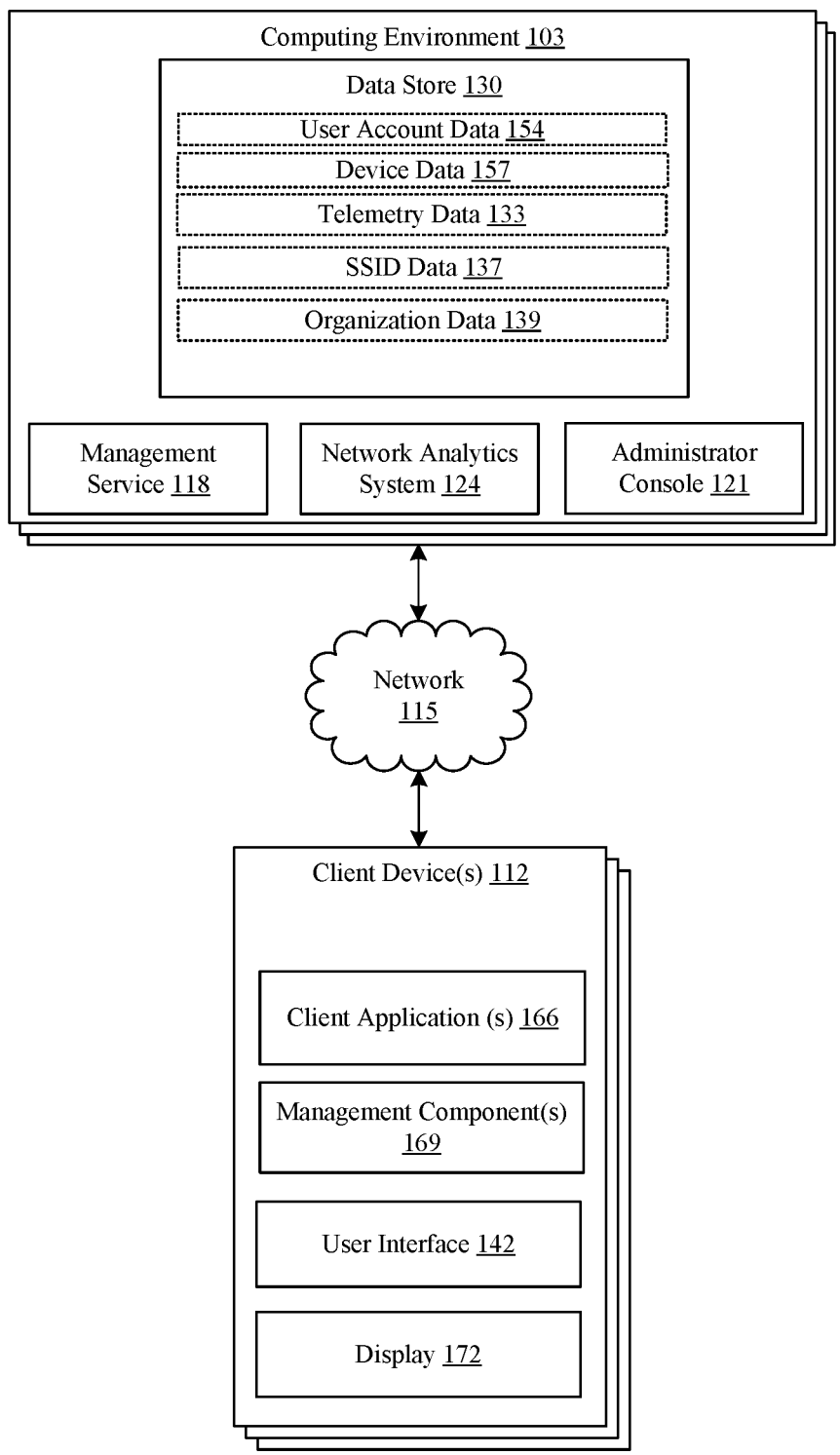
FIG. 1 is a drawing of a networked environment including a management service that manages user client devices and a data analytics system that collects telemetry data from the managed devices and the management system.

With reference to FIG. 1, shown is an example of a networked environment 100. The networked environment 100 can include a computing environment 103 and one or more client devices 112 (also called client device 112) which are in communication with one another over a network 115. The network 115 can include wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 115 can also include a combination of two or more networks 115. Examples of networks 115 can include the Internet, intranets, extranets, virtual private networks (VPNs), and similar networks.

The computing environment 103 can include, for example, a server computer, or any other system providing computing capability. Alternatively, the computing environment 103 can include a plurality of computing devices that are arranged, for example, in one or more server banks, computer banks, or other arrangements. The computing environment 103 can include a grid computing resource or any other distributed computing arrangement. The computing devices can be located in a single installation or can be distributed among many different geographical locations.

The computing environment 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 112 remotely over the network 115, the computing environment 103 can be described as a remote computing environment 103.

Various applications can be executed in the computing environment 103. For example, a management service 118, an administrator console 121, a network analytics system 124, as well as other applications, may be executed in the computing environment. Also, various data is stored in a data store 130 that is accessible to the computing environment 103. The data store 130 may be representative of a plurality of data stores 130, which can include relational databases, object-oriented databases, hierarchical databases, hash tables or similar key-value data stores, as well as other data storage applications or data structures. The data stored in the data store 130 is associated with the operation of the various applications or functional entities described below.

The management service 118 can be executed to oversee the operation of user client devices 112 enrolled with the management service 118. In some examples, an enterprise, such as a company, organization, or other entity, can utilize the management service 118 to oversee or manage the operation of the user client devices 112 of its employees, contractors, customers, or other users having accounts with the enterprise. An enterprise can include any customer of the management service 118. In various examples, the management service 118 can be operated in a multi-tenant environment such that the management service 118 can manage devices on behalf of multiple organizations, enterprises, companies, etc. For example, a first subset of user client devices 112 can be may belong to a first organization group 139 and a second subset of user client devices 112 may belong to a second organization group 139. In various examples, an organization group 139 can accommodate functional, geographical, and organization entities within one or more enterprises and enable a multi-tenancy solution such that groups function as independent environments.

The administrator console 121 can provide an administrative interface for configuring the operation of the management service 118 and the configuration of user client devices 112 that are administered by the management service 118. Accordingly, the administrator console 121 can correspond to a web page or web application provided by a web server hosted in the computing environment 103. For example, the administrator console 121 can provide an interface for an administrative user to create configuration profiles to be applied to individual client devices 112, identify application updates that may be required on individual client devices 112, define recommended applications or updates for individual client devices 112, identify security requirements for individual client devices 112, recommend training that is available for users associated with individual client devices 112, as well as various other actions related to the operation of various implementations.

In addition, the administrator console 121 can provide an interface for an administrative user to visualize the categorization of networks 115 or SSID's associated with client devices 112 connecting to enterprise resources. For example, the SSID's or other information about networks 115 can be extracted from telemetry data 133 obtained from client devices 112 that are managed by the management service 118. Further, the administrator console 121 can provide an interface for an administrative user to review telemetry data 133 collected from the user client devices 112 by the network analytics system 124 in the computing environment.

The network analytics system 124 can be executed to collect telemetry data 133 associated with the client devices 112. In various examples, the network analytics system 124 can receive the telemetry data 133 from one or more of the various devices and/or systems and store the telemetry data in the data store 130. The network analytics system 124 can also obtain the telemetry data 133 from the management service 118. The telemetry data 133 can include information about network connections through which the client devices 112 are communicating with the management service 118 or other services.

In various examples, the network analytics system 124 can analyze the stored raw telemetry data 133 at periodic intervals (e.g., hourly, daily, weekly, etc.) and categorize user accounts or devices into a public network, enterprise network, or a home network device or account. The network analytics system 124 can analyze the SSID of a wireless network connection of a client device 112 that reports network connection data to the management service 118 as telemetry data 133.

Although the management service 118 and the network analytics system 124 are illustrated as being separate applications, it should be noted that some or all the functionality of any one of management service 118 and the network analytics system 124 can be included in the functionality of any one of the management service 118 and the network analytics system 124.

The data stored in the data store 130 can include, for example, user account data 154, device data 157, telemetry data 133, SSID data 137, as well as potentially other data. The user account data 154 can include information pertaining to end users of the client devices 112 enrolled with the management service 118. For instance, the user account data 154 can include data used to authenticate an end user, such as a username, password, email address, biometric data, device identifier, registry identifier, or other data. Additionally, the user account data 154 can include other information associated with an end user, such as name, organization, or other information.

The device data 157 can include information about the client device 112. The device data 157 can include, for example, information specifying applications that are installed on the client device 112, configurations or settings that are applied to the client device 112, user accounts associated with the device 112, the physical location of the client device 112, the enterprise associated with the client device 112, the network to which the client device 112 is connected, the device group(s) to which the client device 112 belongs, and/or other information associated with the client device 112.

The telemetry data 133 can include telemetry data collected by the network analytics system 124 from devices and systems included in the overall IT infrastructure. The telemetry data 133 can be collected from the user client devices 112, the client device 112, the management service 118, and/or other devices or services. In various examples, the telemetry data 133 includes data representing events and metrics associated with the devices and/or services included in the IT infrastructure. In various examples, the telemetry data 133 can be related to device performance, device health, application performance, application usage, network performance, network health, browser web application usage, browser web application performance, and/or other information. For example, the telemetry data 133 can include data regarding system crashes, application crashes, system boot times, system shutdown times, application hangs, application foreground/usage events, device central processing unit (CPU) and memory utilization, battery performance, and/or other type of metric or event that may analyzed to identify a potential issue in the IT infrastructure associated with one or more organizations and/or enterprises. Telemetry data 133 can further include information about network connections of a client device 112. For example, the information can include an SSID of a wireless network connection to which the client device 112 is connected.

SSID data 137 can identify an SSID of a network connection utilized by a client device 112 that is managed by the management service 118. The SSID data 137 can include the SSID along with identifying information about a device that utilized the SSID to communicate with the management service 118. The identifying information about the device can include the SSID and the identifying information about the device can be extracted from the telemetry data 133.

Client device 112 is representative of one or more client devices that may be connected to the network 115. Examples of a client device 112 includes processor-based systems, such as desktop computers, a laptop computers, a personal digital assistant, a cellular telephone, a smartphone, a tablet computer system, smart speakers or similar headless devices, or any other device with like capability. The client device 112 can also be equipped with networking capability or networking interfaces, including a localized networking or communication capability, such as a near-field communication (NFC) capability, radio-frequency identification (RFID) read or write capability, or other localized communication capability.

The client device 112 can include an operating system which can be configured to execute various client applications 166, such as the management components 169, as well as other applications. In particular, the operating system can include a system software that facilitates operation of the user client device 112 or the client device 112, and execution of additional client applications. The main operating system can include an APPLE® iOS operating system, a MICROSOFT® Windows operating system, an APPLE® macOS operating system, a Linux operating system, a GOOGLE® Android operating system, or other operating systems.

Some client applications 166 can access enterprise data and other network content served up by the computing environment 103 or other servers, thereby rendering a user interface 142 on a display 172, such as a liquid crystal display (LCD), touch-screen display, or other type of display device. To this end, some client applications 166, including the management component 169, can include a browser or a dedicated application, and a user interface 142 can include a network page, an application screen, or other interface. In some examples, a network page can include a web page having source code defined in hypertext markup language (HTML), cascading style sheets (CSS), Javascript, jQuery, or other applicable client-side web-based scripting language. Further, other client applications 166 can include device management applications, enterprise applications, social networking applications, word processors, spreadsheet applications, media viewing applications, instant messaging applications, or other applications.

In various examples, and depending on the client device 112, the client application 166, including the management component 169, can interact with the management service 118, network analytics system 124, or other services in the computing environment 103

The management component 169 can be executed by the client device 112 to maintain data communication with the management service 118 to perform various actions on the client device 112 in response to instructions received from the management service 118. In some instances, the management component 169 includes a separate application executing on the client device 112. In other instances, the management component 169 includes a device management framework provided by or included in the operating system installed on the client device 112. The management component 169 can be configured to contact the management service 118 at periodic intervals and request that the management service 118 send any commands or instructions stored in a command queue to the management component 169. The management component 169 can then cause the client device 112 to perform the commands (e.g., provide status request, wipe device, etc.) provided by the management service 118 or cause the client device 112 to modify the configuration settings installed on the client device 112 in accordance with any updated or received configuration profiles received from the management service 118.

The management component 169 can also report telemetry data 133 periodically or upon request to the management service 118. The telemetry data 133 can include information about the status of the client device 112, such as the identity and/or version of installed applications, operating system versions, device permissions that are be utilized by the operating system or applications, CPU usage, memory usage, network usage, and other device status information. Additionally, the telemetry data 133 can include a network address (e.g. IP address), network speed, and a Wi-Fi SSID of a wireless network connection being utilized by the client device 112, if one is being utilized. Examples of the disclosure can rely upon an analysis of the SSID and other identifying information about a client device 112 to classify the client device 112 and/or a user account associated with the client device 112 into a device or user account that predominantly connects to enterprise resources from a home network, a public network, or an enterprise network. In some cases, the network analytics system 124 can determine that a given device or user account is connecting to enterprise resources predominantly through a hybrid of home and public networks. The Wi-Fi SSID is a string that identifies a Wireless Local Area Network (WLAN).

Next, a general description of the operation of the various components of the networked environment 100 is provided. To begin, the management components 169 and/or other client applications 166 can transmit telemetry data 133 over the network to the network analytics system 124. In various examples, the telemetry data 133 can further be collected from the management service 118 and/or other services or devices within the computing environment 103. In particular, the telemetry data 133 that is transmitted to the network analytics system 124 includes event and metric data associated with the operation and functionality of the corresponding devices and/or system and is analyzed to monitor the network connections of the managed client devices 112.

In various examples, the network analytics system 124 analyzes the stored raw telemetry data 133 to classify or categorize a network connection, identified by an SSID of a wireless network, as a public network, a home network, or an enterprise network. The network analytics system 124 can be implemented as part of an enterprise IT device management system that includes a data analytics platform. The data analytics platform collects and analyzes telemetry data 133 from end user devices. The network analytics system 124 can be a standalone system separate from the management service 118, or it can be part of the management service 118.

First, the telemetry data 133 from devices in multiple enterprises can be analyzed to classify Wi-Fi SSIDs into public, home, and enterprise location groups. The classification relies on the property that enterprise or office Wi-Fi networks have a large percentage of devices within an organization connecting to them, and public Wi-Fi networks are accessed by users across multiple organizations.

Client devices 112 and users can then be classified into enterprise, home, and/or hybrid groups based on their Wi-Fi usage patterns. Client devices 112 that use enterprise Wi-Fi networks predominantly are classified into the enterprise group, those that use home or public Wi-Fi predominantly are classified into the home group, and the remaining devices are classified into the hybrid group.

In some examples, once the Wi-Fi SSIDs and devices/users have been classified, reports and dashboards presented to the administrators of the management service 118 and can make use of the classification to compare the experience of devices/users across different groups.

Figure 2:
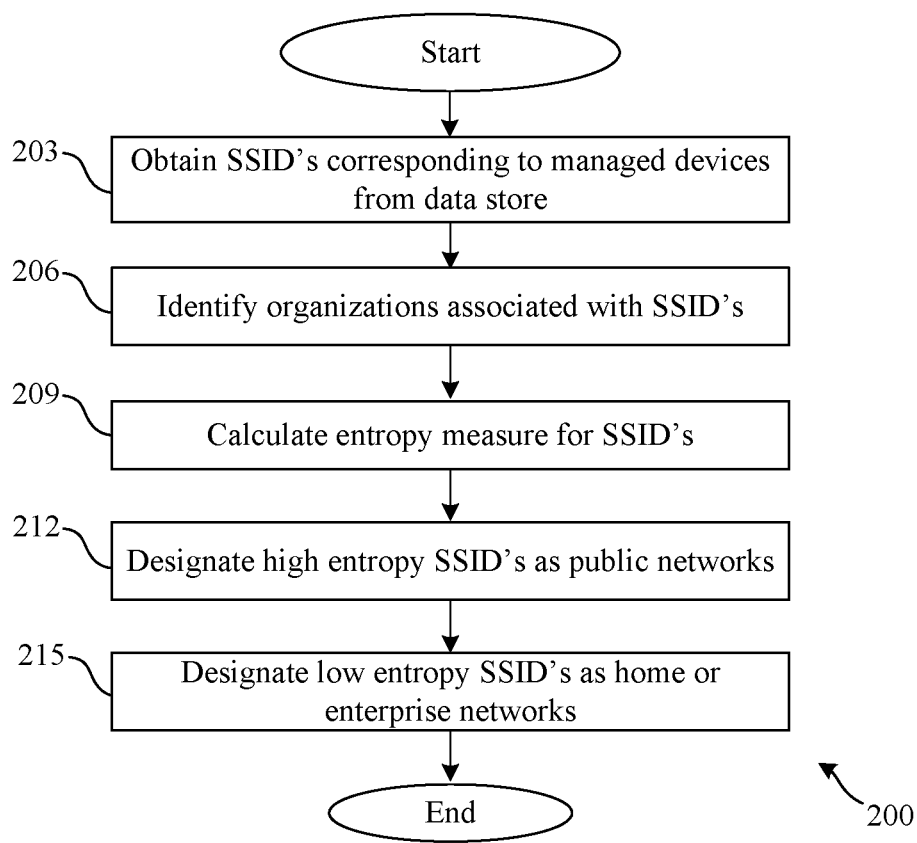
FIG. 2 is a flowchart depicting an example operation of the components of the networked environment.

Moving on to FIG. 2, shown is a flowchart 200 that provides one example of the operation of a portion of the network analytics system 124. The flowchart of FIG. 2 can be viewed as depicting an example of elements of a method implemented by the network analytics system 124 executing in the computing environment 103 according to one or more examples. The separation or segmentation of functionality as discussed herein is presented for illustrative purposes only.

Beginning at step 203, the network analytics system 124 can obtain SSID data 137 corresponding to managed devices, or client devices 112, from the data store 130. The SSID data 137 can be obtained by the management service 118 from telemetry data 133 that is reported by managed client devices 112 to the management service 118. The management component 169 running on the managed client devices 112 can report information about a wireless network connection, such as a Wi-Fi SSID that is being utilized by the client device 112, to the management service 118. The management service 118 can store the SSID utilized by the client device 112 along with identifying information about the client device 112, such as a device identifier, an organization to which the client device 112 belongs, and an identifier of a user account associated with the client device 112.

At step 206, the network analytics system 124 can identify an organization associated with each of the SSID's in the SSID data 137 obtained in step 203. In a multi-tenant environment in which the management service 118 can serve multiple organizations, companies, or enterprises, the network analytics system 124 can analyze SSID data across different organizations to classify the networks utilized by client devices 112 as a home network, public network, or enterprise network.

At step 209, the network analytics system 124 can calculate an entropy measure for the SSID's in the network analytics system 124 obtained in step 203. In one implementation, the number of devices per organization from the SSID data 137 can be normalized to produce a probability score for each organization. The normalization to compute the probability score can be completed as follows. Let $n_i$ be the number of devices using the selected SSID in the $i^{th}$ organization, and $p_i$ be the probability associated with that organization. Then, $p_i$ is computed as $p_i = n_i / \Sigma_{i=1}^{N} n_i$, where N is the quantity of organizations and $n_i$ is the number of devices per organizations in the SSID data 137. The entropy measure associated with the SSID can be computed using the formula $E = -\Sigma_{i=1}^{N} p_i \log(p_i)$. An entropy measure of zero indicates that the SSID is used exclusively by one organization; a non-zero value of the entropy indicates that the SSID is shared across organizations and is likely to be a public Wi-Fi network. The larger the entropy value, the more likely it is that it is a public Wi-Fi network.

Next, at step 212, the network analytics system 124 can classify high entropy SSID's as corresponding to public networks. A high entropy SSID can be an SSID corresponding to an entropy measure that is greater than a threshold. An example threshold can be 0.1. As another example, any non-zero and positive entropy threshold can be designated as associated with a public network.

At step 215, the network analytics system 124 can classify low entropy SSID's as corresponding to an enterprise network or a home network. Any remaining SSID's that are associated with an entropy measure that fails to meet or exceed the entropy measure threshold can be classified as enterprise or home networks, as they are not utilized by a sufficient quantity of devices across multiple organizations. For example, a large number of devices in a particular organizations may utilize a particular SSID, but that could be an indication of an enterprise network rather than a public network. Thereafter, the process can proceed to completion.

Figure 3:
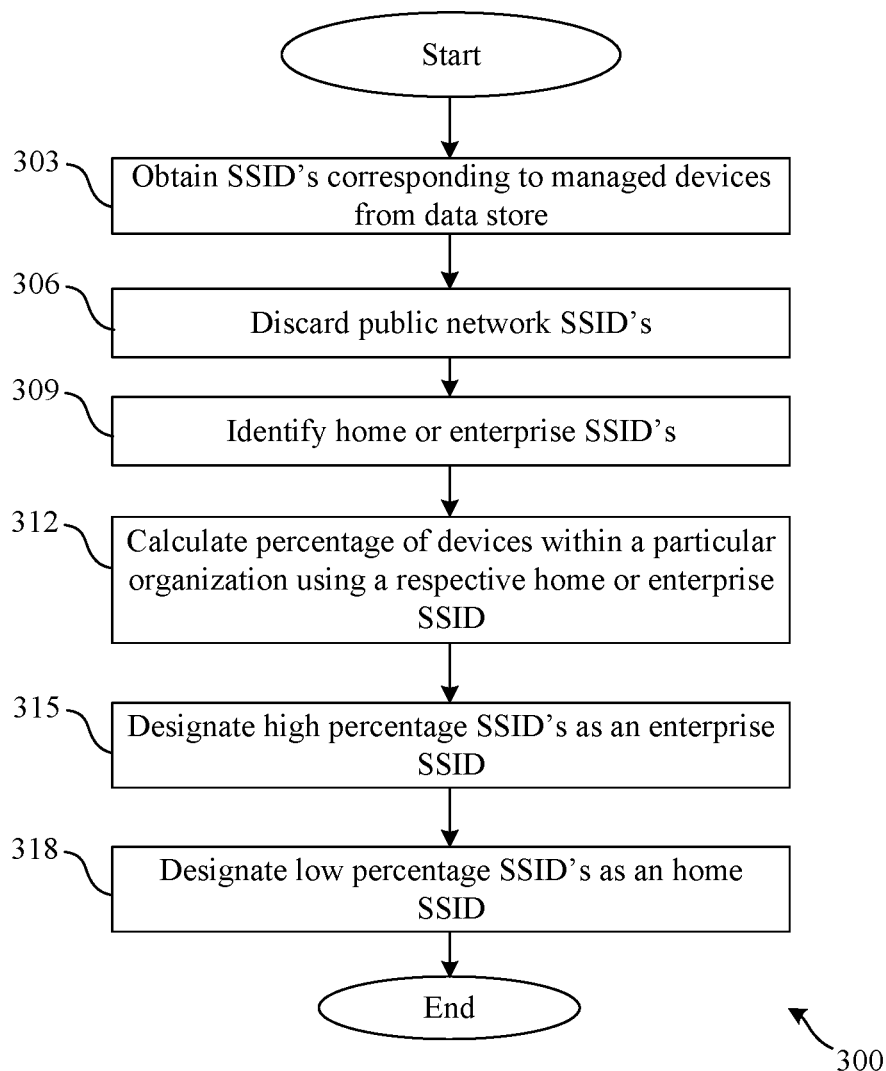
FIG. 3 is a flowchart depicting an example operation of the components of the networked environment.

Moving on to FIG. 3, shown is a flowchart 300 that provides one example of the operation of a portion of the network analytics system 124. The flowchart of FIG. 3 can be viewed as depicting an example of elements of a method implemented by the network analytics system 124 executing in the computing environment 103 according to one or more examples. The separation or segmentation of functionality as discussed herein is presented for illustrative purposes only. The flowchart 300 of FIG. 3 assumes that public networks have been classified according to the process set forth in FIG. 2. In this sense, the flowchart 300 represents a continuation of the process set forth in flowchart 200. The flowchart 300 illustrates how the network analytics system 124 can classify the remaining networks as home networks or enterprise networks.

Beginning at step 303, the network analytics system 124 can obtain SSID data 137 corresponding to managed devices, or client devices 112, from the data store 130. The SSID data 137 can be obtained by the management service 118 from telemetry data 133 that is reported by managed client devices 112 to the management service 118. The management component 169 running on the managed client devices 112 can report information about a wireless network connection, such as a Wi-Fi SSID that is being utilized by the client device 112, to the management service 118. The management service 118 can store the SSID utilized by the client device 112 along with identifying information about the client device 112, such as a device identifier, an organization to which the client device 112 belongs, and an identifier of a user account associated with the client device 112.

At step 306, the network analytics system 124 can discard the public networks classified in the process shown in flowchart 200. In some embodiments, the network analytics system 124 can also obtain SSID data 137 for any nonpublic networks at step 303. At step 309, the remaining SSID's can be identified as home networks or enterprise networks.

At step 312, the percentage of devices within a particular organization using an SSID is computed. For example, if the total number of devices in the organization is 1000 and there are 100 devices using the selected SSID, then the percentage is 10%. After the device percentage is computed, the percentage value is compared against a predefined or configurable threshold. For example, the percentage threshold can be 1%. Any other value between 0 and 100 can be used as the device percentage threshold.

At step 315, the network analytics system 124 can designate high percentage SSID's as an enterprise network. In other words, for those SSID's where more than or equal to the threshold percentage of devices within an organization are using the SSID, these networks can be considered enterprise or office networks.

At step 318, the network analytics system 124 can designate low percentage SSID's as a home network. In other words, for those SSID's where less than or equal to the threshold percentage of devices within an organization are using the SSID, these networks can be considered home networks. Thereafter, the process can proceed to completion.

Figure 4:
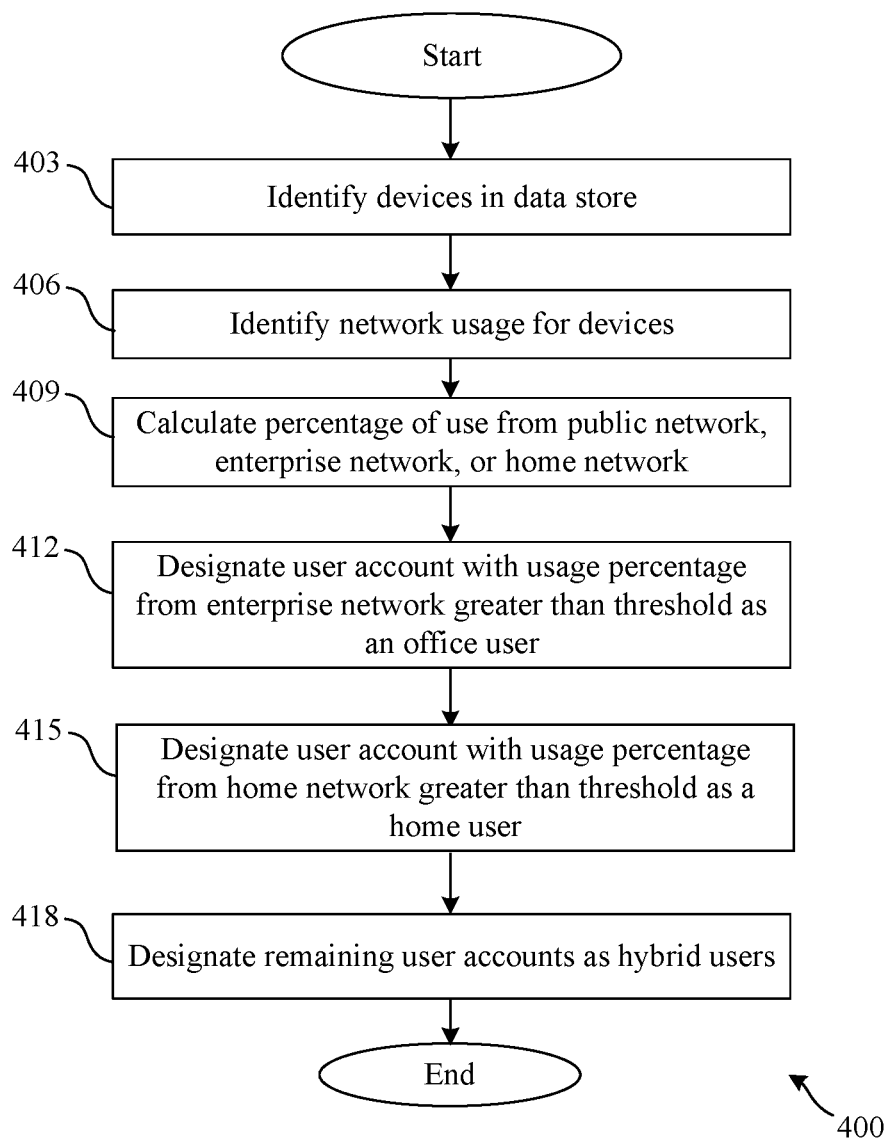
FIG. 4 is a flowchart depicting an example operation of the components of the networked environment.

Moving on to FIG. 4, shown is a flowchart 400 that provides one example of the operation of a portion of the network analytics system 124. The flowchart of FIG. 4 can be viewed as depicting an example of elements of a method implemented by the network analytics system 124 executing in the computing environment 103 according to one or more examples. The separation or segmentation of functionality as discussed herein is presented for illustrative purposes only. The flowchart 400 illustrates how the network analytics system 124 can classify a user or client device 112 as an office user, a home user or a hybrid user based on the type of network that the user or client device 112 predominantly utilizes.

Beginning at step 403, a list of unique devices can be obtained from the data store 130. For example, the event data can be from the most recent one-week period. Any other time interval can be used to retrieve event data in order to find the list of unique devices. Devices can be identified by a unique identifier such as a GUID, IMEI, or any other identifier that can uniquely identify a device in the data store 130.

At step 406, the network analytics system 124 can identify the categorization of the networks used by the client device 112 that was determined according to the processes in flowchart 200 and flowchart 300. Networks can be categorized as home network, public network, or enterprise network devices as shown in flowchart 200 and flowchart 300. In some examples, the network analytics system 124 can identify a usage count corresponding to network type of the client devices 112. The usage count can be the number of connection establishments or the amount of time that an SSID was used. Any other measure that relates to the usage of an SSID can be used as well.

At step 409, the network analytics system 124 can determine a percentage usage of each of the SSID categories. For example, a device can use public Wi-Fi networks 10% of the time, home Wi-Fi networks 20% of the time, and enterprise Wi-Fi networks the remaining 70% of the time. The client device 112, or a user account associated with the client device 112 can then be classified based upon the computed percentage.

At step 412, the network analytics system 124 can designate user accounts with a usage percentage from enterprise networks for greater than a threshold percentage can be classified as an office or enterprise user that predominantly connects to enterprise resources using an enterprise network. For example, the enterprise network usage percentage can be compared against a threshold T to determine if the device is at enterprise locations predominantly. For example, the threshold to compare can be 66.67% (i.e., two-thirds). Any threshold greater than 50% can be used. If the enterprise network usage exceeds T, the user account can be categorized as an office user.

At step 415, the network analytics system 124 can identify home user accounts from the remaining client devices 112 that are not designated as office users. In one example, the network analytics system 124 can sum the usage percentage of public networks and home networks for a given client device 112. If the percentage exceeds T, the user account or client device 112 is not an office user. The user account or client device 112 is designated as a home user.

At step 418, the remaining user accounts or client devices 112 that are analyzed can be designated as hybrid users. A hybrid user is a user that does not work predominantly from home or while connected to an enterprise network. Thereafter, the process can proceed to completion.

The client devices 112 or devices comprising the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor of the client device 112 can be the client application 166, the management component 169, and potentially other applications. Also stored in the memory can be a data store and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 112 can include a display 172 upon which a user interface 142 generated by the administrator console 121, the client application 166, the management component 169, the management service 118, the network analytics system 124, or another application can be rendered. In some examples, the user interface 142 can be generated using user interface data provided by the computing environment 103. The client device 112 can also include one or more input/output devices that can include, for example, a capacitive touchscreen or other type of touch input device, fingerprint reader, or keyboard.

Although the management service 118, administrator console 121, the network analytics system 124, the client application 166, the management component 169, and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram of FIG. 2 and the flowcharts of FIGS. 3 and 4 show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram of FIG. 2 and the flowcharts of FIGS. 3 and 4 show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

The invention claimed is:

1. A system, comprising:
a computing device comprising a processor and a memory; and
machine-readable instructions stored in the memory which, when executed by the processor, cause the computing device to at least:
obtain telemetry data from a plurality of client devices within a plurality of organizations over a period of time, the telemetry data identifying at least one network condition under which respective client devices connect to a unified endpoint management (UEM) system;
categorize a network through which individual ones of the client devices are connecting to the UEM system based upon the at least one network condition, wherein the network through which individual ones of the client devices are connecting to the UEM system is categorized based on a respective service set identifier (SSID) associated with a respective wireless network connection of the individual ones of the client device, wherein the network is categorized by:
identifying a plurality of SSIDs utilized by the plurality of client devices;
identifying the plurality of organizations utilizing the plurality of SSIDs;
calculating a respective entropy value for individual ones of the plurality of SSIDs, wherein the respective entropy value represents a measure of how many organizations utilize a respective SSID; and
designating the network as a public network in response to the entropy measure exceeding an entropy threshold; and
categorize a respective user account associated with individual ones of the client devices into a public network account, a home network account, or an enterprise network account based upon the at least one network condition and a categorization of the network.

2. The system of claim 1, wherein the respective SSID is reported to a management service executed by the computing device by a management component running on the individual ones of the client devices.

3. The system of claim 1, wherein, when executed by the processor, the machine readable instructions further categorize the respective user account as a public network account in response to the network being designated as the public network.

4. The system of claim 1, wherein the network through which individual ones of the client devices are connecting to the UEM system is further categorized by:
   eliminating a plurality of public network SSIDs from the plurality of SSIDs;
   identifying a percentage of client devices using a respective SSIDs within the plurality of client devices;
   designating the network as an enterprise network in response to the percentage meeting or exceeding a percentage threshold, wherein the network is designated as a home network in response to the percentage being less than the percentage threshold.

5. The system of claim 4, wherein, when executed by the processor, the machine readable instructions further categorize the respective user account as an enterprise network account in response to the network being designated as the enterprise network or a home network account in response to the network being designated as the home network.

6. A non-transitory computer-readable medium embodying executable instructions which, when executed by a computing device, cause the computing device to at least:
   obtain telemetry data from a plurality of client devices within a plurality of organizations over a period of time, the telemetry data identifying at least one network condition under which respective client devices connect to a unified endpoint management (UEM) system;
   categorize a network through which individual ones of the client devices are connecting to the UEM system based upon the at least one network condition, wherein the network through which individual ones of the client devices are connecting to the UEM system is categorized based on a respective service set identifier (SSID) associated with a respective wireless network connection of the individual ones of the client device, wherein the network is categorized by:
      identifying a plurality of SSIDs utilized by the plurality of client devices;
      identifying the plurality of organizations utilizing the plurality of SSIDs;
      calculating a respective entropy value for individual ones of the plurality of SSIDs, wherein the respective entropy value represents a measure of how many organizations utilize a respective SSID; and
      designating the network as a public network in response to the entropy measure exceeding an entropy threshold; and
   categorize a respective user account associated with individual ones of the client devices into a public network account, a home network account, or an enterprise network account based upon the at least one network condition and a categorization of the network.

7. The non-transitory computer-readable medium of claim 6, wherein the respective SSID is reported to a management service executed by the computing device by a management component running on the individual ones of the client devices.

8. The non-transitory computer-readable medium of claim 6, wherein, when executed by the processor, the machine readable instructions further categorize the respective user account as a public network account in response to the network being designated as the public network.

9. The non-transitory computer-readable medium of claim 6, wherein the network through which individual ones of the client devices are connecting to the UEM system is further categorized by:
   eliminating a plurality of public network SSIDs from the plurality of SSIDs;
   identifying a percentage of client devices using a respective SSIDs within the plurality of client devices;
   designating the network as an enterprise network in response to the percentage meeting or exceeding a percentage threshold, wherein the network is designated as a home network in response to the percentage being less than the percentage threshold.

10. The non-transitory computer-readable medium of claim 9, wherein, when executed by the processor, the machine readable instructions further categorize the respective user account as an enterprise network account in response to the network being designated as the enterprise network or a home network account in response to the network being designated as the home network.

11. A computer-implemented method, comprising:
   obtaining telemetry data from a plurality of client devices within a plurality of organizations over a period of time, the telemetry data identifying at least one network condition under which respective client devices connect to a unified endpoint management (UEM) system;
   categorizing a network through which individual ones of the client devices are connecting to the UEM system based upon the at least one network condition, wherein the network through which individual ones of the client devices are connecting to the UEM system is categorized based on a respective service set identifier (SSID) associated with a respective wireless network connection of the individual ones of the client devices, wherein the network is categorized by:
      identifying a plurality of SSIDs utilized by the plurality of client devices;
      identifying the plurality of organizations utilizing the plurality of SSIDs;
      calculating a respective entropy value for individual ones of the plurality of SSIDs, wherein the respective entropy value represents a measure of how many organizations utilize a respective SSID; and
      designating the network as a public network in response to the entropy measure exceeding an entropy threshold; and
   categorizing a respective user account associated with individual ones of the client devices into a public network account, a home network account, or an enterprise network account based upon the at least one network condition and a categorization of the network.

12. The computer-implemented method of claim 11, wherein the respective SSID is reported to a management service executed by the computing device by a management component running on the individual ones of the client devices.

13. The computer-implemented method of claim 11, wherein the network through which individual ones of the client devices are connecting to the UEM system is categorized by:
- eliminating a plurality of public network SSIDs from the plurality of SSIDs;
- identifying a percentage of client devices using a respective SSID's within the plurality of client devices;
- designating the network as an enterprise network in response to the percentage meeting or exceeding a percentage threshold, wherein the network is designated as a home network in response to the percentage being less than the percentage threshold.

14. The computer-implemented method of claim 13, wherein categorizing the respective user account as an enterprise network account is performed in response to the network being designated as the enterprise network or a home network account in response to the network being designated as the home network.

* * * * *